Oct. 13, 1925.
R. L. LEE
ELECTRICAL APPARATUS
Filed Feb. 25, 1924
1,557,213
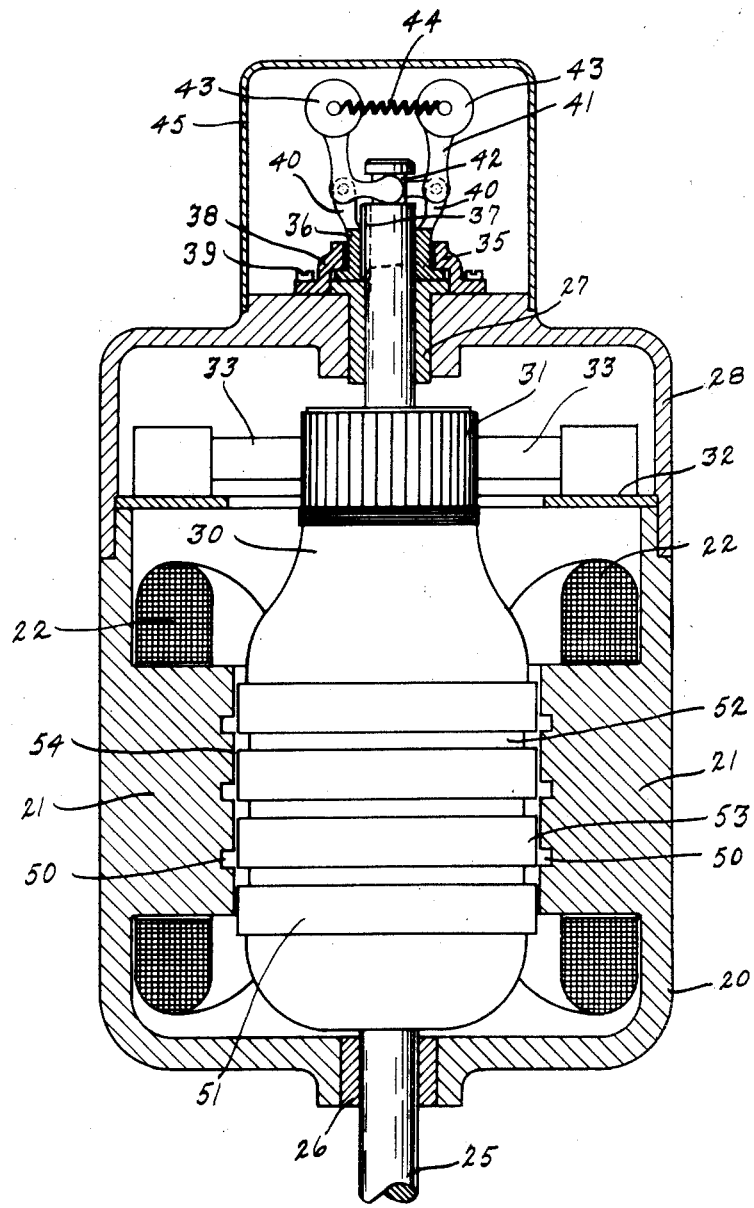
Inventor
Ralph L. Lee
By Spencer Sewall and Hardman
His Attorneys Patented Oct. 13, 1925.

1,557,213

UNITED STATES PATENT OFFICE.

RALPH L. LEE, OF DAYTON, OHIO, ASSIGNOR TO DELCO-LIGHT COMPANY, OF DAYTON, OHIO, A CORPORATION OF DELAWARE.

ELECTRICAL APPARATUS.

Application filed February 25, 1924. Serial No. 694,835.

*To all whom it may concern:*

Be it known that I, RALPH L. LEE, a citizen of the United States of America, residing at Dayton, county of Montgomery, and State of Ohio, have invented certain new and useful Improvements in Electrical Apparatus, of which the following is a full, clear, and exact description.

This invention relates to electric motors and has for its object to maintain substantially constant the speed thereof regardless of variations in load or voltage.

In the disclosed embodiment of the invention, a motor is provided with an endwise movable armature which is adapted to be shifted endwise by means of a speed responsive device. The pole faces of the motor are provided with grooves forming pole teeth, and the core of the armature is provided with corresponding grooves forming core teeth, normally in staggered relation with respect to the grooves and teeth respectively in the pole faces. By a comparatively short movement of the armature endwise, the grooves and teeth in said core are moved into or out of alignment with the grooves and teeth in the pole faces, thereby varying the motor field strength by varying the magnetic flux to maintain the speed of the armature substantially constant.

Further objects and advantages of the present invention will be apparent from the following description, wherein a preferred form of embodiment of the present invention is clearly shown.

In the drawings:

The figure of the drawing is a sectional view of a motor embodying the present invention.

Referring to the drawings, a motor frame 20 provides pole pieces 21 which support field coils 22. A shaft 25 which is journalled in bearings 26 and 27 carried by motor frame 20 and motor end frame 28 respectively, carries an armature 30 having a commutator 31. The armature 30 is normally decentered with respect to the pole pieces 21. A plate 32 supports brushes 33 for engagement with commutator 31. Shaft 25 is endwise movable through bearings 26 and 27 and is provided adjacent its upper end, as viewed in the drawing, with a keyway 35.

The speed responsive device includes a flanged member 36 which is supported by shaft 25 and is provided with a key 37 received by key-way 35 in said shaft. Member 36 is held against endwise movement by a retaining flange 38 which is secured to end frame 28 by screws 39. Member 36 is provided with upstanding arms 40 to which are pivoted bell crank arms 41, one end of which respectively engage annular groove 42 adjacent the upper end of shaft 25. The opposite ends of arms 41 carry fly balls or weights 43 which are connected together by a spring 44. Cover 45 encloses the speed responsive device.

The faces of field poles 21 are provided with oppositely disposed equally spaced grooves 50, and core 51 of armature 30 is provided with similarly spaced annular grooves 52, the grooves 52, as shown in the drawings, being normally in staggered relation with respect to the grooves 50 in the faces of field poles 21. These grooves provide core bands 53 and pole bands 54 respectively.

*Mode of operation.*

The drawing shows the motor armature and speed responsive device in normal position. As the armature speed increases beyond a certain predetermined speed, the weights 43 will fly outwardly against the tension of spring 44, and arms 41 moving upon their pivots will lift shaft 25 upwardly, thus tending to center the armature core with respect to the pole pieces by bringing the armature core bands 53 and pole bands 54 more nearly into alignment. As bands 53 are brought into alignment with bands 54, it will be apparent that the magnetic flux flowing between the armature core 51 and the field poles 21 will be increased, thereby strengthening the motor field, increasing the counter E. M. F. and cutting down the speed of the armature to the predetermined amount. However, upon slowing down of the armature below the predetermined speed due to increased load or drop in voltage, the spring 44 will draw weights 43 toward each other, thereby causing arms 41 to move shaft 25 and armature 30 downwardly to the position shown in the drawing. The magnetic flux flowing between the armature core 51 and the field poles 21 will be decreased, thereby weakening the motor field and tending to increase the speed of the armature to the predetermined amount.

While the form of embodiment of the present invention as herein disclosed, constitutes a preferred form, it is to be understood that other forms might be adopted, all coming within the scope of the claims which follow.

What is claimed is as follows:

1. An electric motor comprising, in combination, field poles provided with grooved faces, an armature provided with an annularly grooved core and adapted to be shifted endwise between said pole pieces, and speed responsive means for shifting the armature endwise thereby varying the relative position of said grooves to vary the motor field strength and maintain the speed of the motor substantially uniform.

2. An electric motor comprising, in combination, field poles, the inner faces of which are provided with grooves, an armature having the outer surface of its core provided with annular grooves which are normally in staggered relation with respect to the grooves in said pole pieces, and speed responsive means for moving the armature endwise to vary the relative position of said grooves whereby to vary the motor field strength and maintain the motor at substantially constant speed.

In testimony whereof I hereto affix my signature.

RALPH L. LEE.